United States Patent [19]

O'Sullivan

[11] 4,176,474
[45] Dec. 4, 1979

[54] VISUAL TEACHING AID FOR NUMBER CONCEPT

[76] Inventor: Rita O'Sullivan, 165 Thomas St., Brentwood, N.Y. 11717

[21] Appl. No.: 938,880

[22] Filed: Sep. 1, 1978

[51] Int. Cl.² ............................................. G09B 1/08
[52] U.S. Cl. ......................................... 35/73; 35/31 B
[58] Field of Search .................... 35/31 R, 31 A, 31 B, 35/31 D, 31 F, 73, 30

[56] References Cited

U.S. PATENT DOCUMENTS

| 384,959 | 6/1888 | Carr | 35/73 |
| 1,081,815 | 12/1913 | De La Rose | 35/31 R X |
| 2,853,804 | 9/1958 | Bengeyfield | 35/73 X |
| 3,360,874 | 1/1968 | Myers | 35/31 A X |

FOREIGN PATENT DOCUMENTS

| 1400572 | 4/1965 | France | 35/31 D |
| 1208949 | 10/1970 | United Kingdom | 35/73 |

*Primary Examiner*—Harland S. Skogquist
*Attorney, Agent, or Firm*—Richard L. Miller

[57] ABSTRACT

An educational device for teaching whole numbers to children; the device including a board having horizontal rows of pockets, and each pocket of the rows is identified either as "ones", "tens", "hundreds" etc. in proper sequence, so that cards having numerical digits printed on them can be placed by a child in the pockets, in response to a whole number, printed on a different set of cards, and which are called out by a teacher.

3 Claims, 3 Drawing Figures

VISUAL TEACHING AID FOR NUMBER CONCEPT

This invention relates to educational devices for young children.

A principal object of the present invention is to provide a device for teaching a child how to write a whole number that is comprised of a plurality of numerical digits, so that the child will know which digit in a whole number represents a "ones", "tens", "hundreds" and the like.

Another object is to provide a teaching aid which will appeal to smaller children because it involves a physical construction activity of placing objects into their proper positions.

Still another object is to provide a teaching aid which can be used in reverse, by a teacher displaying a whole number in digits, and having a student to pick the correct card that has the same whole number thereupon written out in words.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Figure 1:
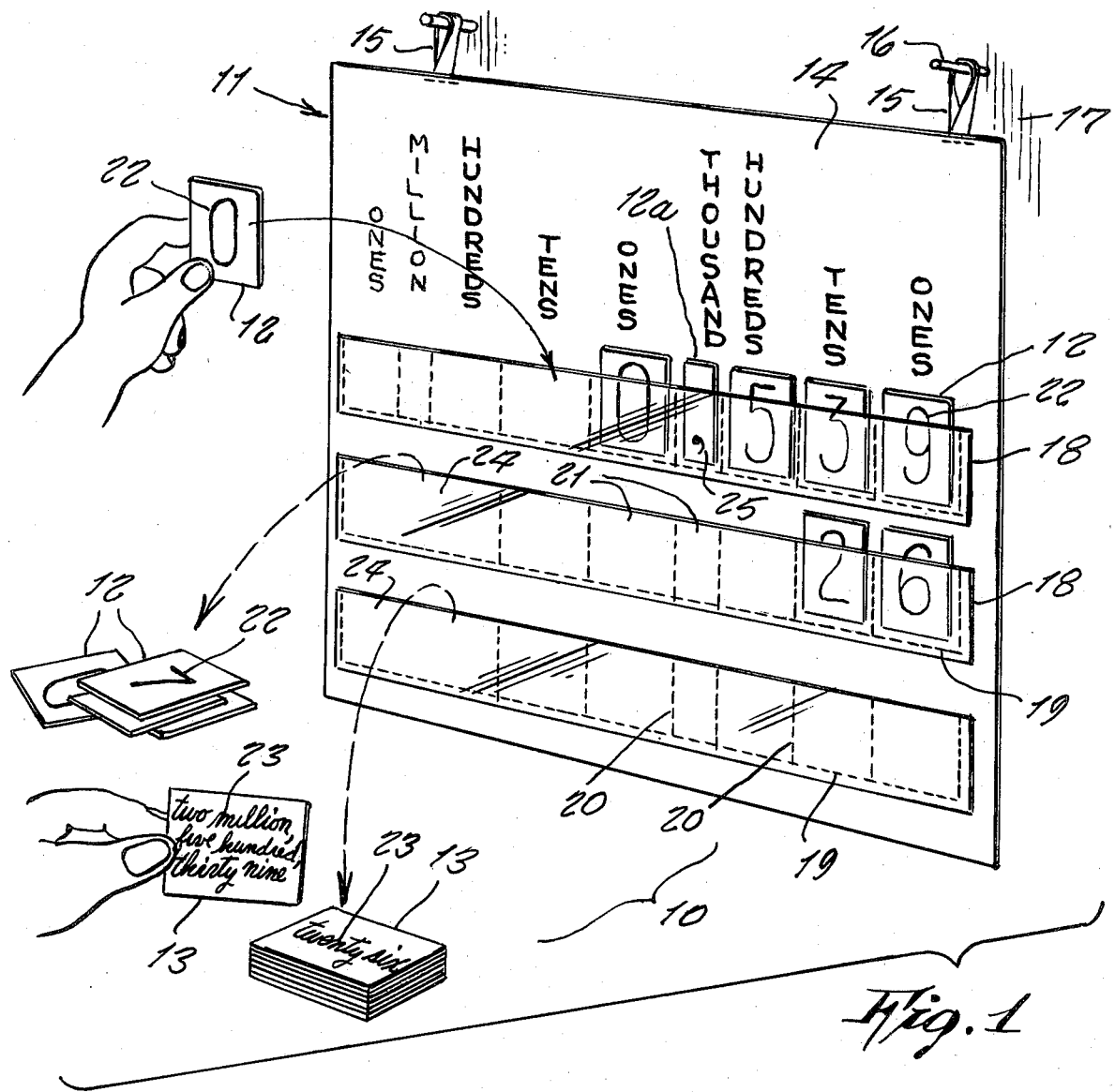
FIG. 1 is a perspective view of the invention.

Refering now to the drawing in greater detail, and more particularly to FIG. 1 thereof at this time, the reference numeral 10 represents a teaching aid according to the present invention, wherein there is a display board 11 upon which selected cards 12 can be placed so to correspond to those of a different set of cards 13, not displayed upon the board.

The display board may comprise a foldable fabric panel 14 having loops 15 sewn along an upper edge so to be supported from pegs or hooks 16 secured in a wall 17. Upon the front side of the panel, there are sewn several horizontally extending, wide tapes 18 made of a flexible, transparent plastic sheeting material and which includes a horizontal stitch 19 along a lower edge thereof, and several, spaced apart, vertical stitches 20 in order to form pockets 21 therebetween and which are open on top. Upon an upper portion of the panel, there are printed the words "ones", "tens", "hundreds", "thousand", "ones", "tens", "hundreds" and "million" in succession, starting from right and leading to left, the words being each made with one letter thereof over each other, and each of the words being located directly above the pockets of the uppermost row of pockets in order to identify the pockets therebelow numberically.

Each of the cards 12 is printed with a single numerical digit, as shown at 22.

Each of the cards 13 is printed with a whole number, as shown at 23; the number being printed in word text, and not in digits.

A left endmost pocket 24 in each of the two lowermost rows of pockets serve as storage pockets for each of the deck of cards 12 and 13, when not in use.

In operative use, a teacher reads out loud a whole number 23 that is printed on one of the cards 13. The child then composes the same whole number upon the board by inserting the cards 12 in the appropriate pocket, as is shown in FIG. 1, so that it reads as same as on the card 13, if correct. Accordingly the child must consider which pocket takes the "ones", "tens", "hundreds", etc.

It is to be noted that several cards 12a are included in the deck of cards 12, and which are printed only with a comma 25, for being placed in the pockets identified with "thousand" and "million".

The device may be used in reverse, if so wished so appropriate cards 13 are picked by a student, and which correspond to whole numbers composed on the board.

Figures 2, 3:
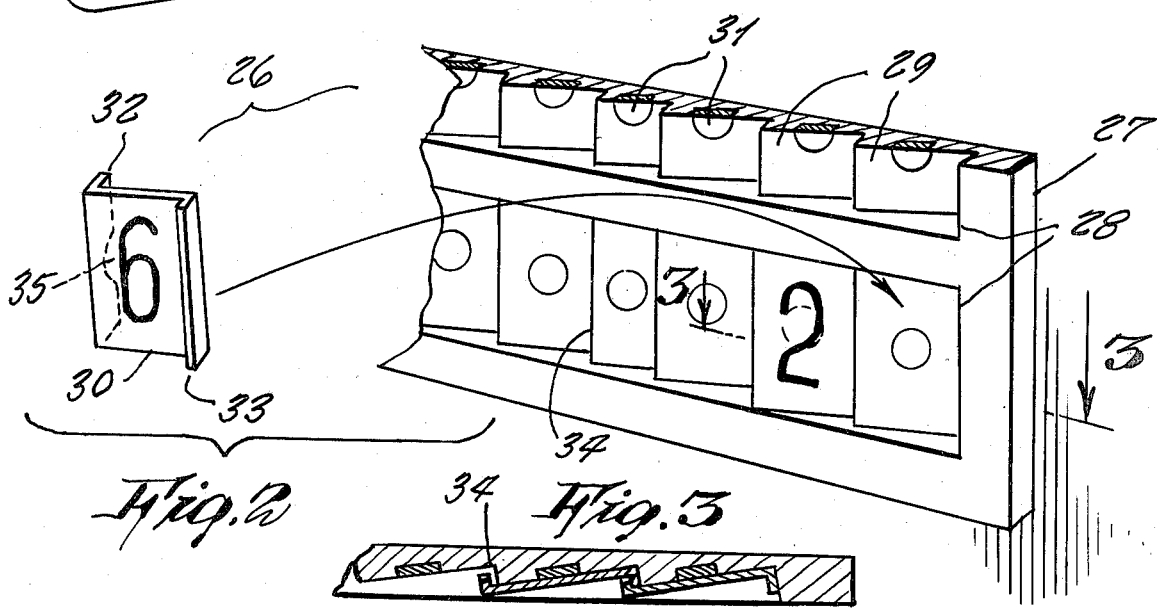
FIG. 2 is a fragmentary perspective of another design thereof made with rigid back panel and playing pieces magnetically adhered thereto; and the playing pieces being designed so to be interfilled in order that the lowest numerical digit must be positioned last.
FIG. 3 is a cross section on line 3—3 of FIG. 2.

In FIGS. 2 and 3, a modified design 26 of the invention, shows the board 27 molded with horizontal grooves 28 each of which has a plurality of sidewardly angled rear facets 29 against each of which a card 30 (corresponding to abovedescribed card 12) is placed. The cards 30 are made of sheet steel and are held against the board by a permanent magnet 31 imbedded in each facet 29. Each card 30 includes a rearwardly bent flange 32 along the left edge, and a forwardly bent flange 33 along the right side. The flanges serve to make it easier for snugly fitting on the board, if the left end card is positioned first, and cards are added succesive toward the right. This will cause the child to compose a whole number, starting with left end digits thereof first, so to correspond to the way that it is written in words and stated orally.

Each card left flange overlaps a right flange of a card at its left, when properly placed so right flanges 33 fit into corners 34.

A notch 35 in the left flange 32 serves to easily remove a card from the board.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A visual teaching aid for number concept, comprising in combination, a display board, a first deck of cards for selective display on said board, and a second deck of cards each one of which has a whole number printed thereupon in words, each card of said first deck having a numerical digit printed thereupon, and said board having at least one horizontal row of stations in each of which one said card of said first deck is placable, a right endmost station being identified as "ones", and successively next left stations being identified as "tens", "hundreds", "thousand", "ones", "tens", "hundreds", "million" and "ones".

2. The combination as set forth in claim 1 wherein said stations comprise pockets that allow visibility thereinto from a front side to see said digits of said first cards placed therein.

3. The combination as set forth in claim 1 wherein said board is molded with a horizontal groove forming said row of stations, each said station comprising a sidewardly inclined rear facet having a permanent magnet, and each said card being made of sheet steel; and means for snugly fitting said cards in said stations when a leftmost thereof is positioned first, and successively a next right card is then positioned, said means comprising overlapping flanges on said cards.

* * * * *